(12) United States Patent
Mori (10) Patent No.: US 8,585,129 B2
(45) Date of Patent: Nov. 19, 2013

(54) VEHICLE FRONT STRUCTURE

(75) Inventor: Takeo Mori, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 159 days.

(21) Appl. No.: 13/148,872

(22) PCT Filed: Feb. 25, 2010

(86) PCT No.: PCT/IB2010/000382
§ 371 (c)(1),
(2), (4) Date: Aug. 10, 2011

(87) PCT Pub. No.: WO2010/097690
PCT Pub. Date: Sep. 2, 2010

(65) Prior Publication Data
US 2011/0309655 A1 Dec. 22, 2011

(30) Foreign Application Priority Data

Feb. 26, 2009 (JP) ................................. 2009-043832
Nov. 9, 2009 (JP) ................................. 2009-256060

(51) Int. Cl.
*B60J 7/00* (2006.01)
(52) U.S. Cl.
USPC .................................................... 296/187.09
(58) Field of Classification Search
USPC .................. 296/187.09, 187.03, 203.01, 205, 296/203.02
See application file for complete search history.

(56) References Cited

U.S. PATENT DOCUMENTS

| 4,190,276 | A | * | 2/1980 | Hirano et al. | 293/133 |
| 4,702,515 | A | * | 10/1987 | Kato et al. | 296/187.01 |
| 5,431,445 | A | * | 7/1995 | Wheatley | 280/784 |
| 5,853,195 | A | * | 12/1998 | Le et al. | 280/784 |
| 5,876,078 | A | * | 3/1999 | Miskech et al. | 293/133 |
| 6,511,119 | B2 | * | 1/2003 | Takase et al. | 296/187.09 |
| 6,695,393 | B1 | * | 2/2004 | Aouadi et al. | 296/187.09 |
| 7,137,472 | B2 | * | 11/2006 | Aoki | 180/274 |
| 7,185,945 | B2 | * | 3/2007 | Dandekar et al. | 296/187.09 |
| 7,533,913 | B2 | * | 5/2009 | Bae | 293/133 |
| 7,543,537 | B2 | * | 6/2009 | Seitzberger et al. | 105/392.5 |
| 7,617,916 | B2 | * | 11/2009 | Heatherington et al. | 188/371 |

(Continued)

FOREIGN PATENT DOCUMENTS

JP A-05-024558 2/1993
JP U-06-027439 4/1994

(Continued)

OTHER PUBLICATIONS

International Search Report issued in International Patent Application No. PCT/IB2010/000382 dated Jun. 7, 2010.

(Continued)

*Primary Examiner* — Kiran B Patel
(74) *Attorney, Agent, or Firm* — Oliff & Berridge, PLC (57) ABSTRACT

A front buckling point and a rear buckling point are set at non-end positions along a longitudinal direction of a front side member respectively. Further, the front buckling point and the rear buckling point are respectively arranged at different positions in the width and vertical directions of the front side member. The front buckling point is arranged on an outboard and upper side of the front side member. The rear buckling point is arranged on an inboard and lower side of the front side member.

9 Claims, 8 Drawing Sheets

(56) References Cited

U.S. PATENT DOCUMENTS

| | | | |
|---|---|---|---|
| 7,748,507 B2 * | 7/2010 | Canot et al. | 188/377 |
| 7,762,619 B2 * | 7/2010 | Baccouche et al. | 296/187.09 |
| 7,871,122 B2 * | 1/2011 | Salomonsson | 296/187.03 |
| 7,887,122 B2 * | 2/2011 | Baccouche et al. | 296/187.09 |
| 7,887,123 B2 * | 2/2011 | Honji et al. | 296/187.09 |
| 7,992,926 B2 * | 8/2011 | Tamakoshi | 296/187.09 |
| 8,056,685 B2 * | 11/2011 | Canot et al. | 188/377 |
| 8,123,284 B2 * | 2/2012 | Hedderly | 296/193.06 |
| 8,177,277 B2 * | 5/2012 | Hedderly | 296/29 |
| 8,201,872 B2 * | 6/2012 | Baccouche et al. | 296/187.09 |
| 8,231,166 B2 * | 7/2012 | Mori | 296/187.09 |
| 8,286,765 B2 * | 10/2012 | Canot et al. | 188/377 |
| 8,317,964 B2 * | 11/2012 | Hedderly | 156/304.5 |
| 2002/0060463 A1 * | 5/2002 | Gotanda et al. | 293/132 |
| 2004/0201253 A1 * | 10/2004 | Kitagawa et al. | 296/187.03 |
| 2005/0065665 A1 | 3/2005 | Mae | |
| 2005/0151392 A1 * | 7/2005 | Yasukouchi et al. | 296/187.03 |
| 2007/0040414 A1 * | 2/2007 | Frederick et al. | 296/187.09 |
| 2008/0098601 A1 * | 5/2008 | Heinz et al. | 29/897.2 |
| 2008/0122255 A1 * | 5/2008 | Tamakoshi et al. | 296/187.08 |
| 2009/0085362 A1 * | 4/2009 | Terada et al. | 293/132 |
| 2009/0261602 A1 * | 10/2009 | Karlander | 293/132 |
| 2010/0066124 A1 * | 3/2010 | Terada et al. | 296/187.09 |
| 2010/0117385 A1 * | 5/2010 | Jenuwine et al. | 293/132 |
| 2010/0148526 A1 * | 6/2010 | Karlander | 293/155 |
| 2011/0210582 A1 * | 9/2011 | Mori | 296/193.07 |
| 2011/0304128 A1 * | 12/2011 | Mori | 280/781 |
| 2012/0152675 A1 * | 6/2012 | Mori | 188/377 |

FOREIGN PATENT DOCUMENTS

| | | |
|---|---|---|
| JP | A-10-129521 | 5/1998 |
| JP | A-2002-114171 | 4/2002 |
| JP | A-2003-205855 | 7/2003 |
| JP | B2-3533011 | 5/2004 |
| JP | 103 09 626 A1 | 9/2004 |
| JP | B2-3591448 | 11/2004 |
| JP | A-2005-022617 | 1/2005 |
| JP | A-2005-297830 | 10/2005 |
| JP | A-2006-027455 | 2/2006 |
| JP | B2-4096615 | 6/2008 |
| JP | A-2008-207619 | 9/2008 |
| JP | A-2010-070133 | 4/2010 |

OTHER PUBLICATIONS

Written Opinion issued in International Patent Application No. PCT/IB2010/000382 dated Jun. 7, 2010.

Partial translation of Sep. 5, 2012 Japanese Office Action issued in Application No. JP-A-2009-256060.

* cited by examiner

VEHICLE FRONT STRUCTURE

BACKGROUND OF THE INVENTION

1. Field of the Invention

The invention relates to a vehicle front structure, and more particularly, to a vehicle front structure having a framework member that is appropriately deformed when a load is input to the vehicle front structure in a longitudinal direction of a vehicle.

2. Description of the Related Art

A vehicle front structure is required to absorb a load received upon a collision of a vehicle or the like. As a structure for suitably absorbing such a load, there is described in Japanese Patent Application Publication No. 2008-207619 (JP-A-2008-207619) a vehicle framework structure having a plurality of buckling lines, the lower portions of which are inclined forward, arranged side by side on a longitudinally extending portion of a front side member that forms a framework of a vehicle.

In the described vehicle framework structure, because the buckling lines are formed, the front side member may be collapse along the buckling lines if a collision occurs. As a result, the amount of offset with respect to a kick portion in a vertical direction may be reduced, and the bending moment of the kick portion is accordingly reduced.

However, in the vehicle framework structure described in Japanese Patent Application Publication No. 2008-207619 (JP-A-2008-207619), if the front side member collapses upon a collision of the vehicle, the longitudinally extending portion is deformed along the buckling lines, and the front side member becomes deformed so that the front end of the longitudinally extending portion moves downward. Thus, during deformation of the front side member, the front side member interferes with an engine or an engine mount and hence may be prevented from appropriately deforming. If the framework member, such as the front side member or the like, is thus prevented from appropriately deforming, appropriate damping of the load imparted through the collision may be prevented.

SUMMARY OF THE INVENTION

The invention provides a vehicle front structure that appropriately damps a load imparted through a collision of a vehicle by preventing a framework member from interfering with the engine or the like as the framework member deforms during a collision.

An aspect of the invention relates to a vehicle front structure that includes a long framework member that extends in a longitudinal direction of a vehicle. The vehicle front structure is characterized in that the framework member has a front inflection portion and a rear inflection portion that are separate from each other in a longitudinal direction of the framework member and at that are provide at different positions in at least one of a width direction of the framework member and a vertical direction of the framework member, and in that the front inflection portion and the rear inflection portion are compressively deformed to buckle the framework member in a convexo-concave manner when the framework member receives an impact load along the longitudinal direction of the framework member.

In the vehicle front structure according to the invention, the front inflection portion and the rear inflection portion are formed respectively at two locations of the framework member that are separated from each other and at different positions in the width or vertical direction of the framework member. Due to the formation of the front inflection portion and the rear inflection portion, the front inflection portion and the rear inflection portion are inflected to buckle the framework member in a convexo-concave manner when a load is input to the framework member along the longitudinal direction of the framework member. Accordingly, the framework member buckles, in a desired mode in accordance with the positions where the front inflection portion and the rear inflection portion are set. Thus, during deformation of a front side member resulting from a collision of the vehicle or the like, the deformed front side member does not interfere with an engine or the like. As a result, the load resulting from the collision is appropriately damped.

Further, in the foregoing aspect of the invention, the front inflection portion may be arranged above the rear inflection portion.

In the described structure, the front inflection portion is arranged above the rear inflection portion. If a load is input to the framework member along the longitudinal direction of the framework member, the front inflection portion and the rear inflection portion are compressively deformed to buckle the framework member in a convexo-concave manner. Thus, a front portion of the framework member may be bent downward so that the front end of the front portion approaches a position of a kick portion. Therefore, the bending moment of the kick portion may be damped.

Furthermore, in the foregoing aspect of the invention, the front inflection portion may be arranged inboard of the rear inflection portion.

With the described structure, the front inflection portion is arranged inboard of the rear inflection portion. If a load is input to the framework member along the longitudinal direction of the framework member, the front inflection portion and the rear inflection portion are compressively deformed to buckle the framework member in a convexo-concave manner. Thus, if the engine or the like is provided at laterally behind the framework member, the deformation of the framework member when a collision of the vehicle occurs does not interfere with the engine or the like. As a result, the load imparted by the collision may be appropriately damped.

Further, in the described structure, the front inflection portion and the rear inflection portion may be both cross-sectional corner portions of the framework member, and may be provided at diagonally opposite cross-sectional corner of the framework member.

Accordingly, the front inflection portion and the rear inflection portion are both the cross-sectional corner portions of the framework member, and are arranged at diagonally opposite cross-sectional corner of the framework member. If a load is input to the framework member in the longitudinal direction of the framework member, the front inflection portion and the rear inflection portion are compressively deformed to buckle the framework member in a convexo-concave manner. Thus, the framework member is inflected diagonally with respect to an axial direction thereof. Therefore, the amount of deformation may be reduced, and the absorption of the impact force may be improved.

Furthermore, in the described structure, the front inflection portion and the rear inflection portion are both formed by making a proof strength along the longitudinal direction of the framework member lower at those positions of the framework member which are located around a cross-section thereof than at the other positions of the framework member.

According to the aforementioned construction, the front inflection portion and the rear inflection are both designed such that the proof strength along the longitudinal direction of the framework member is lower at those positions of the framework member which are located around the cross-section thereof than at the other positions of the framework member. Thus, among the positions on a peripheral cross-section of the framework member including the front inflection portion and the rear inflection portion, the front inflection portion and the rear inflection portion can be appropriately inflected. Accordingly, a framework member that reliably buckles in a convexo-concave manner may be formed.

Further, in the aforementioned construction, ridge lines for transmitting a load along the longitudinal direction of the framework member may converge at at least one of the front inflection portion and the rear inflection portion.

According to the aforementioned construction, at least one of the front inflection portion and the rear inflection portion is formed by connecting the ridge lines for transmitting a load along the longitudinal direction of the framework member. Due to the formation of these ridge lines, the load can be reliably transmitted to the front inflection portion and the rear inflection portion. Thus, the front inflection portion and the rear inflection portion can be appropriately inflected. Therefore, the framework member can be reliably buckled in a convexo-concave manner.

Furthermore, in the aforementioned construction, the framework member may have a mount member, which is a support object supported by the framework member, mounted on a lateral portion thereof, and at least one of the front inflection portion and the rear inflection portion may be formed by connecting ridge lines for transmitting a load input via the mount member.

According to the aforementioned construction, at least one of the front inflection portion and the rear inflection portion is formed by connecting the ridge lines for transmitting a load input via the mount member. Thus, the load input via the mount member is guided to the front inflection portion and the rear inflection portion and hence can be reliably transmitted. Accordingly, the front inflection portion and the rear inflection portion can be appropriately inflected. Therefore, the framework member can be reliably buckled in a convexo-concave manner.

The vehicle front structure according to the invention can appropriately damp a load resulting from a collision of the vehicle by preventing the framework member from interfering with the engine or the like when the framework member is deformed due to the collision or the like.

BRIEF DESCRIPTION OF THE DRAWINGS

The foregoing and further features and advantages of the invention will become apparent from the following description of an example embodiment of the invention with reference to the accompanying drawings, wherein like numerals are used to represent like elements and wherein:

FIG. 8 is a lateral view showing an example of the front side member after a collision of the vehicle has occurred.

DETAILED DESCRIPTION OF EMBODIMENT

An embodiment of the invention will be described below with reference to the accompanying drawings. It should be noted that in the drawings like elements are denoted by like reference symbols respectively and that any redundant description of those elements is omitted. Further, for the sake of convenience of diagrammatic representation, the dimensional ratios in the drawings do not necessarily coincide with those in the description.

Figure 1:
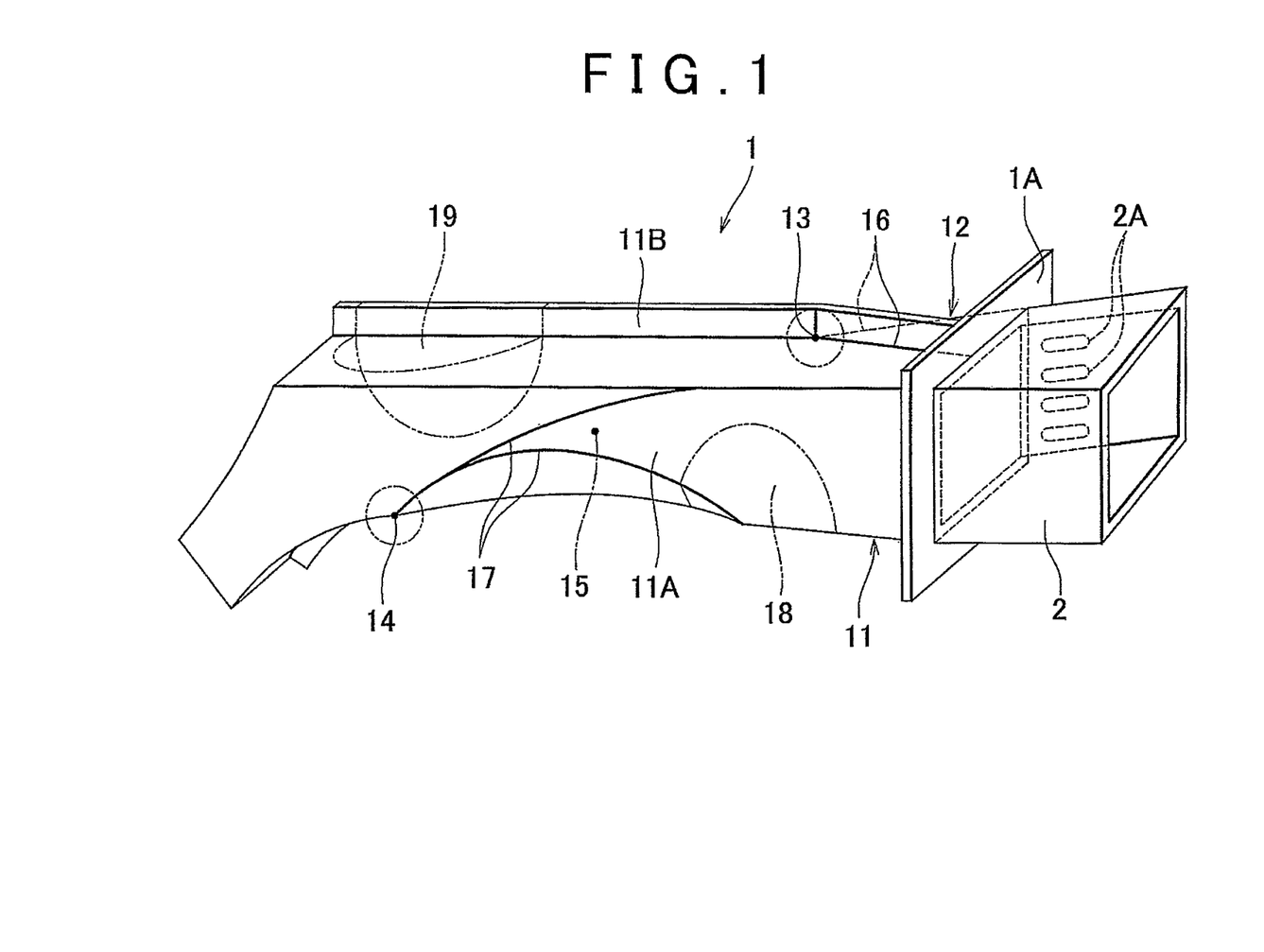
FIG. 1 is a perspective view of a front side member in a vehicle front structure according to the embodiment of the invention.
Figure 2:
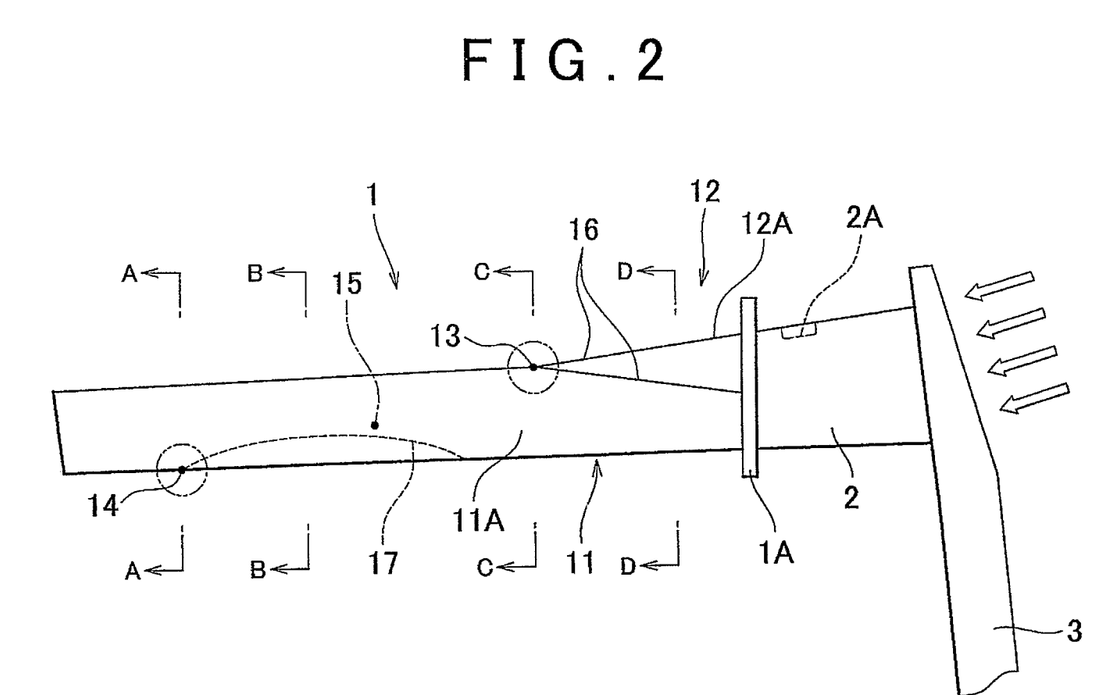
FIG. 2 is a lateral view of the front side member in the vehicle front structure according to the embodiment of the invention.
Figures 3A, 3B:
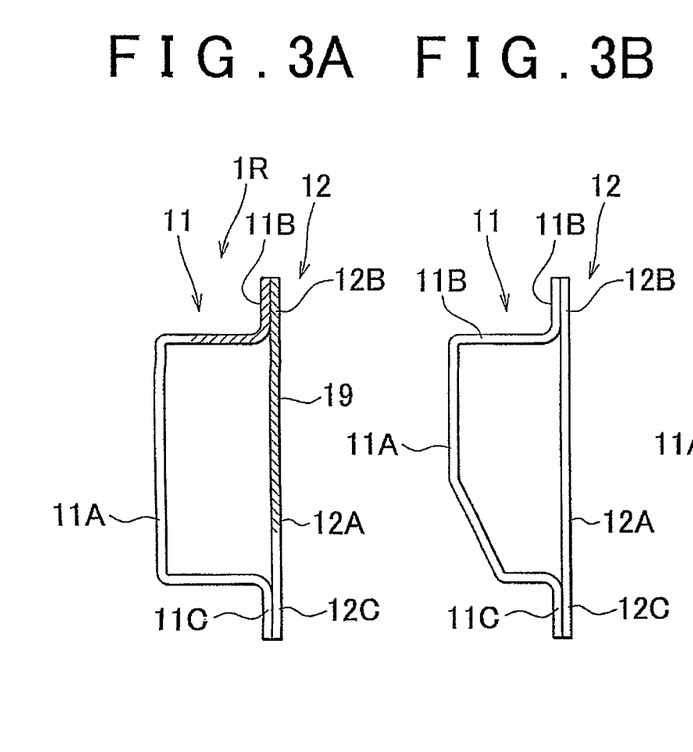
FIG. 3A is a cross-sectional view taken along a line A-A of FIG. 2.
FIG. 3B is a cross-sectional view taken along a line B-B of FIG. 2.
Figures 3C, 3D:
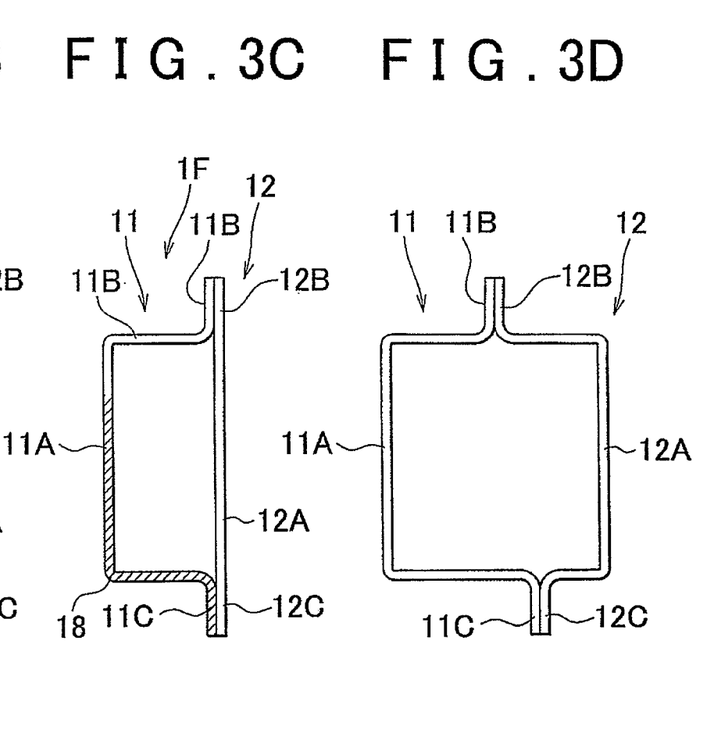
FIG. 3C is a cross-sectional view taken along a line C-C of FIG. 2.
FIG. 3D is a cross-sectional view taken along a line D-D of FIG. 2.
Figure 4:
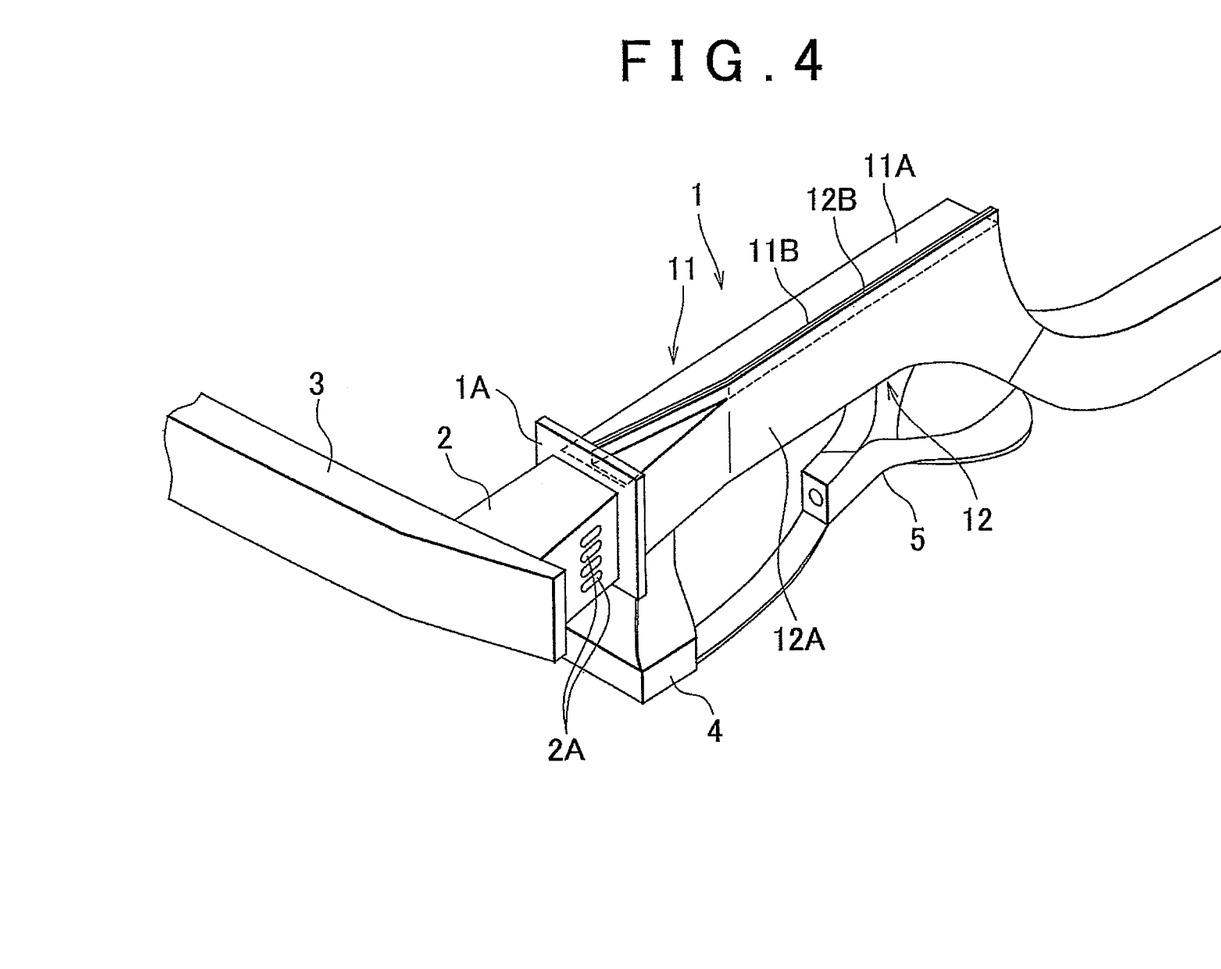
FIG. 4 is a perspective view of a portion of the vehicle front structure according to the embodiment of the invention.
Figure 5:
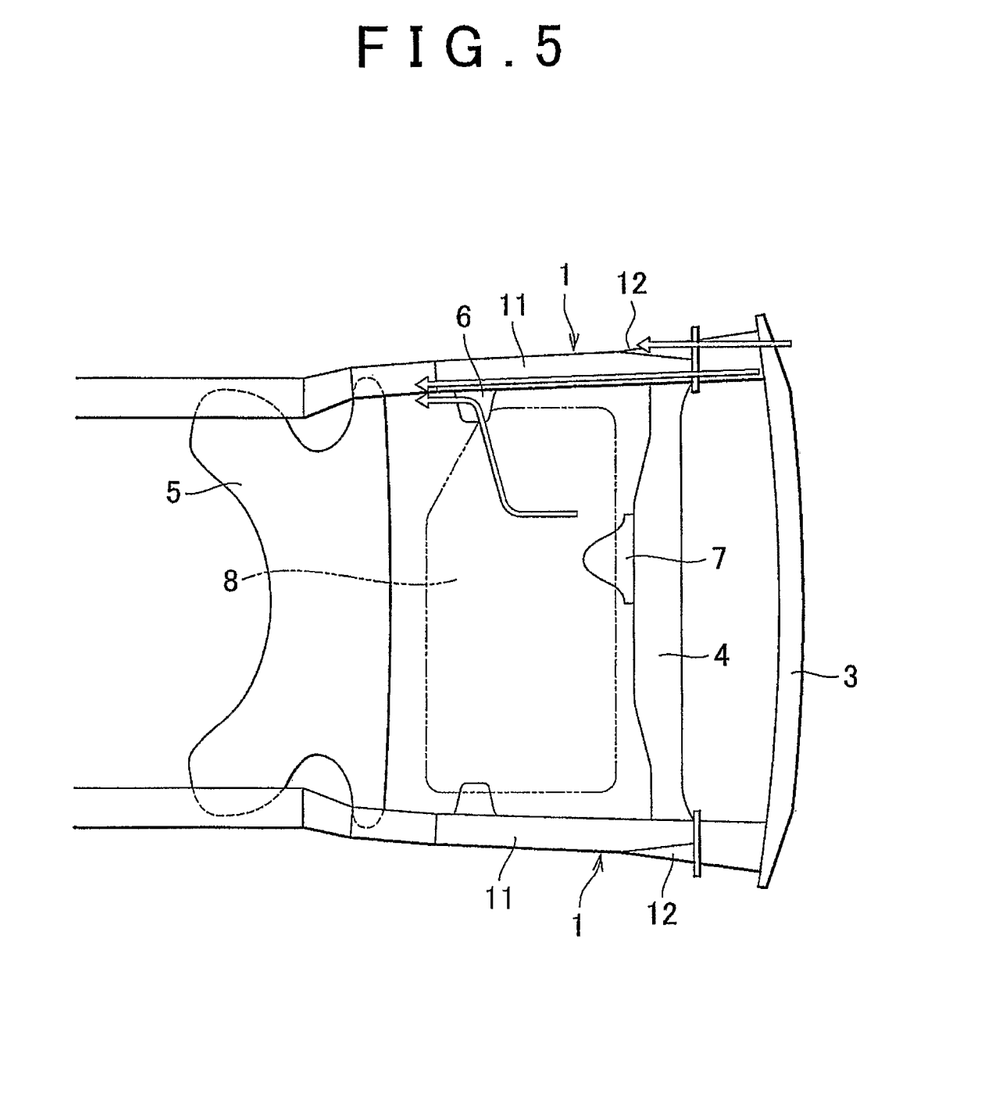
FIG. 5 is a plan view of the vehicle front structure according to the embodiment of the invention.

FIG. 1 is a perspective view of a front side member in a vehicle front structure according to the embodiment of the invention. FIG. 2 is a lateral view of FIG. 1. FIG. 3A is a cross-sectional view taken along a line A-A of FIG. 2. FIG. 3B is a cross-sectional view taken along a line B-B of FIG. 2. FIG. 3C is a cross-sectional view taken along a line C-C of FIG. 2. FIG. 3D is a cross-sectional view taken along a line D-D of FIG. 2. Further, FIG. 4 is a perspective view of a portion of the vehicle front structure according to the embodiment of the invention. FIG. 5 is a plan view of the vehicle front structure according to the embodiment of the invention.

As shown in FIGS. 1 to 3D, a front side member 1 in a vehicle front structure according to this embodiment of the invention is long and extends in a longitudinal direction of the vehicle. Further, a crash box 2 is provided at the front end of the front side member 1. A rear flange member 1A, formed in a generally rectangular shape when viewed from the front end of, the front side member 1, is provided at the region where the front side member 1 is joined to the crash box 2. Further, the crash box 2 is provided with a plurality of reinforcement beads 2A on the rear of the outer surface of the crash box 2.

As shown in FIGS. 3A to 3D, the front side member 1 is formed by joining an inner member 11 to an outer member 12. The inner member 11 includes an inner member body 11A extending in the longitudinal direction of the vehicle. An inner member upper joint flange 11A is provided on the upper side of the outer surface of the inner member body 11A, and an inner member lower joint flange 11C is provided on the lower side of the outer surface of the inner member body 11A.

As shown in FIGS. 3A to 3D, the outer member 12 includes an outer member body 12A extending in the longitudinal direction of the vehicle. Further, an outer member upper joint flange 12B is provided on an upper side of a front end side of the outer member 12, and an outer member lower joint flange 12C is provided on a lower side of the front end side of the outer member 12.

Furthermore, on the rear side of the outer member 12, the outer member body 12A is flat, and is formed integrally with the outer member upper joint flange 12B and the outer member lower joint flange 12C. Further, as shown in FIG. 2, on the front side of the outer member 12, the outer member 12 is flared with respect to the width direction of the vehicle.

On the front side of the outer member 12, the outer member 12 is flared with respect to the width direction of the vehicle.

Therefore, as shown in FIG. 3D, in a cross-section on the front side of the front side member 1, the inner member upper joint flange 11B and the outer member upper joint flange 12B are arranged at an intermediate position in a width direction of the front side member 1. On the other hand, in a cross-section at a position other than the front side of the front side member 1, as shown in FIGS. 3A to 3C, the inner member upper joint flange 11B and the outer member upper joint flange 12B are arranged at an outer end of the front side member 1.

Further, as shown in FIGS. 1 and 2, a front buckling point 13, serving as a front inflection portion, and a rear buckling point 14, serving as a rear inflection portion, are provided respectively at, an intermediate positions of the front side member 1 in a longitudinal direction of the front side member 1. Further, a central point 15 is set at a substantially central position of the front side member 1 in the longitudinal direction thereof. The front buckling point 13 and the rear buckling point 14 are arranged symmetrically to each other with respect to the central point 15.

The front buckling point 13 is arranged at a joint portion between the inner member upper joint flange 11B and the outer member upper joint flange 12B. The front buckling point 13 is located between the front end of the front side member 1 and the central point 15. Thus, the front buckling point 13 is arranged on an outer and upper side of the front side member 1.

In contrast, the rear buckling point 14 is arranged on the lower end side of the inner member body 11A of the inner member 11. The rear buckling point 14 is located between a rear end of the front side member 1 and the central point 15. Thus, the rear buckling point 14 is arranged on an inner and lower side of the front side member 1. In this manner, the front buckling point 13 and the rear buckling point 14 are formed at different positions in the width and vertical directions with respect to a neutral line (an axis) of the front side member 1.

Two upper ridge lines 16 are provided on the upper side of the front end side of the front side member 1. The two upper ridge lines 16 are both straight, and the rear ends of both upper ridge lines 16 converge at the front buckling point 13. In addition, two lower ridge lines 17 are provided on the lower side of the rear end side of the front side member 1. The two lower ridge lines 17 are both curved, more specifically, have central portions curved upward, and the rear ends of both lower ridge lines 17 converge at the rear buckling point 14.

A diagonal position around a cross-section 1F of the front side member 1 including the front buckling point 13 (a cross-section shown in FIG. 3C, which will be hereinafter as "a front cross-section") is designed as a front high-strength portion 18. The front high-strength portion 18 is formed during the molding of the inner member body 11A by subjecting the region of the front side member 1 to a curing process. Thus, when the front side member 1 is buckled and inflected in the front cross-section 1F, compressive deformation of the front side member 1 occurs at the front buckling point 13 so that the front high-strength portion 18 is subjected to tensile deformation.

Comparing proof strengths of respective corner portions of the front side member 1 in this cross-section 1F in the longitudinal direction of the front side member 1 (hereinafter referred to as "longitudinal proof strengths") with one another, as shown in FIG. 3C, the front high-strength portion 18 has the highest longitudinal proof strength, and the front buckling point 13 has the lowest longitudinal proof strength. Further, the corner portion that is located above the front high-strength portion 18 has a lower longitudinal proof strength than the corner portion that is located below the front buckling point 13.

Furthermore, a diagonal position around a cross-section 1R of the front side member 1 including the rear buckling point 14 (a cross-section shown in FIG. 3A, which will be referred to hereinafter as "a rear cross-section") serves as the rear high-strength portion 19. The rear high-strength portion 19 is formed through a curing process during the molding of the inner member body 11A of the front side member 1, as with the front high-strength portion 18. Thus, if the front side member 1 is buckled and inflected in the rear cross-section 1R, compressive deformation of the front side member 1 occurs at the rear buckling point 14 so that the rear high-strength portion 19 is subjected to tensile deformation.

Comparing longitudinal proof strengths of respective corner portions of the front side member 1 in this rear cross-section 1R with one another, as shown in FIG. 3A, the rear high-strength portion 19 has the highest longitudinal proof strength. Further, the corner portion that is located below the rear high-strength portion 19 has a lower longitudinal proof strength than the corner portion that is located at the rear buckling point 14.

In addition, comparing the front cross-section 1F of the front side member 1 and the rear cross-section 1R of the front side member 1 with each other, the front cross-section 1F is lower in longitudinal proof strength than the rear cross-section 1R as a whole. It should be noted, however, that the front high-strength portion 18, which has the highest longitudinal proof strength in the front cross-section 1F, has a higher longitudinal proof strength than the rear buckling point 14, which has the lowest longitudinal proof strength in the rear cross-section 1R.

Further, as shown in FIGS. 4 and 5, a bumper reinforcement 3 is joined to the front end of the front side member 1 via the crash box 2. A front cross member 4 extending in a lateral direction of the vehicle is joined to one side at the front end of the front side member 1. Further, a suspension member 5 extending in the lateral direction of the vehicle is joined to one side at the rear end of the front side member 1.

Furthermore, a lateral engine mount 6 is fitted at a lateral position of the front side member 1 at a substantially central position of the front side member 1 in the longitudinal direction of the front side member 1. Further, a central engine mount 7 is fitted at a substantially central position of the front cross member 4 in the longitudinal direction of the front side member 1. A power train unit 8 includes an engine that is mounted on these mounts, namely, the lateral engine mount 6 and the central engine mount 7. The power train unit 8 is supported by the front side member 1 and the front cross member 4 via the lateral engine mount 6 and the central engine mount 7.

The lateral engine mount 6 is joined to the front side member 1 between the front cross-section 1F of the front side member 1 and the rear cross-section 1R. Thus, the front buckling point 13 is provided between the portion of the front side member 1 joined to the front cross member 4 and the portions that is joined to the lateral engine mount 6. Further, the rear buckling point 14 is provided between the lateral engine mount 6 on the front side member 1 and the suspension member 5.

Next, the operation of the vehicle front structure according to this embodiment of the invention will be described. In the vehicle front structure according to this embodiment of the invention, when the front side member 1 receives an impact load due to a collision of a front part of the vehicle or the like, the front buckling point 13 and the rear buckling point 14 are compressively deformed to buckle and deform the front side member 1 in a convexo-concave manner (in a generally Z-shape). Thus, the load input to the front side member 1 is damped.

It is assumed that the load received by the bumper reinforcement 3 due to a head-on collision of the vehicle. In this case, as shown in FIG. 5, the load received by the bumper reinforcement 3 is input from a front portion of the front side member 1 via the crash box 2. In addition, the load is input to a lateral portion of the front side member 1 via the central engine mount 7, the power train unit 8, and the lateral engine mount 6.

Figure 6A:
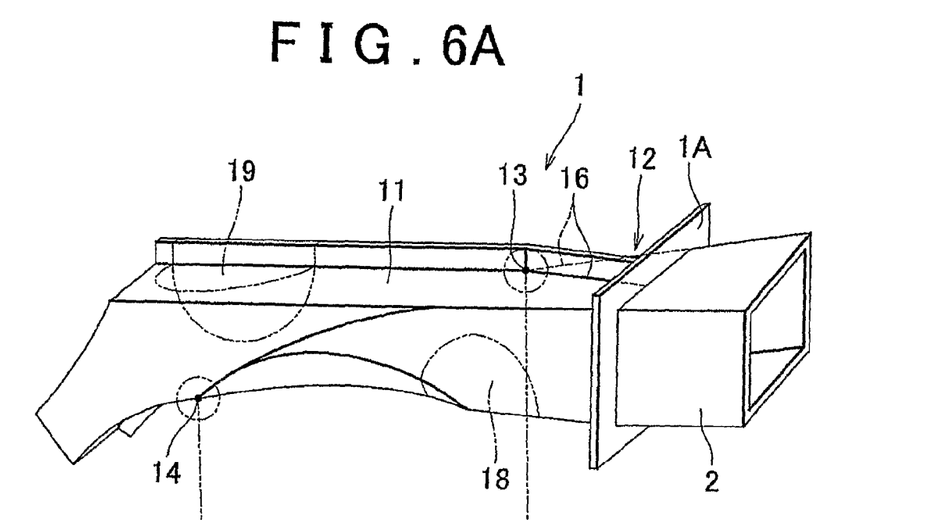
FIG. 6A is a perspective view of the front side member before a collision of a vehicle.

When the front portion of the front side member 1 receives an impact load, deformation of the front side member 1 starts in the front cross-section 1F. In the front cross-section 1F, the front buckling point 13 shown in FIG. 6A is lowest in longitudinal proof strength. Thus, the front buckling point 13 serves as a buckling point during the deformation of the front side member 1.

Figure 6B:
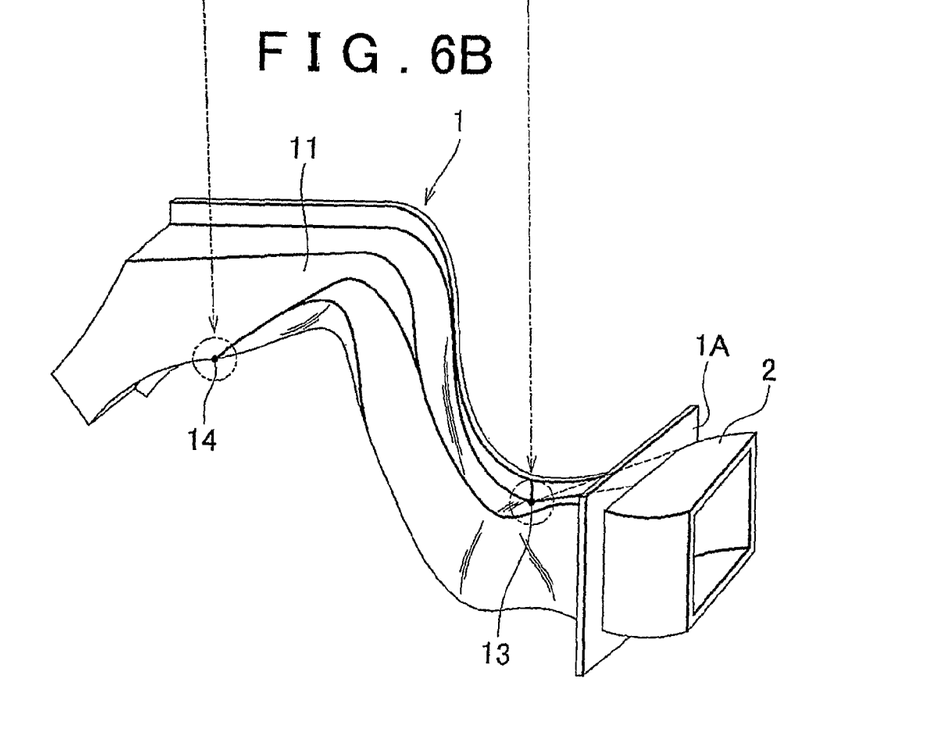
FIG. 6B is a perspective view showing an example of the front side member after a collision of the vehicle has occurred.

The front buckling point 13 is arranged at upper and outer side of the front cross-section 1F of the front side member 1. Thus, as shown in FIG. 6B, the front side member 1 is inflected around the front buckling point 13 such that the inflected portion around the front buckling point 13 of the front side member 1 is bent inward and downward. The front high-strength portion 18 is formed at the position diagonal to the front buckling point 13. Thus, the front high-strength portion 18 is prevented from being deformed at an early stage. Therefore, the front side member 1 is more stably inflected such that the inflected portion around the front buckling point 13 of the front side member 1 is bent inward and downward.

The two upper ridge lines 16 converge at the front buckling point 13. Thus, more ridge lines converge at the front buckling point 13 than at the other corner portions of the front cross-section 1F. Therefore, the load becomes concentrated at the front buckling point 13. Accordingly, the front side member 1 may be appropriately inflected about the front buckling point 13. Due to the inflection of the front side member 1 in the front cross-section 1F, the load received by the front side member 1 is damped.

Further, although the front cross-section 1F has a lower longitudinal proof strength than the rear cross-section 1R, the front high-strength portion 18, which has the highest longitudinal proof strength in the front cross-section 1F, has a higher longitudinal proof strength than the rear buckling point 14, which has the lowest longitudinal proof strength in the rear cross-section 1R. Thus, the front side member 1 starts to be inflected in the rear cross-section 1R while being inflected in the front cross-section 1F.

In the rear cross-section 1R, the rear buckling point 14 has the lowest longitudinal proof strength. Thus, when the front side member 1 is inflected in the rear cross-section 1R, the rear buckling point 14 serves as a buckling point during the inflection of the front side member 1.

It should be noted herein that the rear buckling point 14 is formed on the lower edge of the inner member 11 of the rear cross-section 1R of the front side member 1. Thus, as shown in FIG. 6B, the portion of the front side member 1 that is inflected in the rear cross-section 1R around the rear buckling point 14 is bent directed outward and upward. In addition, the rear high-strength portion 19 is formed at the position diagonal to the rear buckling point 14. Thus, premature deformation of the rear high-strength portion 19 is prevented. Therefore, the front surface of the crash box 2 continues to face forward even after inflecting the front side member 1. As a result, the absorption of a load can be stably realized.

Furthermore, the two lower ridge lines 17 converge at the rear buckling point 14. Therefore, more ridge lines converge at the rear buckling point 14 than at the other corner portions of the rear cross-section 1R. Therefore, the load becomes concentrated at the rear buckling point 14. Accordingly, the front side member 1 may be appropriately inflected about the rear buckling point 14. Due to the inflection of the front side member 1 at the rear cross-section 1R, the load input to the front side member 1 is damped.

Further, the load applied via the lateral engine mount 6 is also input to the rear cross-section 1R. The load applied via the lateral engine mount 6 as well as the load received by the front of the front side member 1 inflects the front side member 1 in the rear cross-section 1R. At this moment, due to the inflection of the front side member 1 at the rear cross-section 1R, the load input via the lateral engine mount 6 as well as the load received by the front of the front side member 1 is then be damped.

Furthermore, the load received by the lateral engine mount 6 is input to the rear buckling point 14 via the two lower ridge lines 17. In this manner, the load applied via the lateral engine mount 6 is guided to the two lower ridge lines 17. Accordingly, the load applied via the lateral engine mount 6 may be reliably transmitted to the rear buckling point 14.

As described above, in the vehicle front structure according to this embodiment of the invention, the front side member 1 is inflected around the front buckling point 13 such that the inflected portion around the front buckling point 13 of the front side member 1 is bent inward and downward, and is inflected around the rear buckling point 14 such that the inflected portion around the buckling point 14 of the front side member 1 is bent outward and upward. Thus, as shown in FIG. 6B, the front side member 1 buckles in a convexo-concave manner (in a generally Z-shape). Because the front side member 1 buckles in a generally Z-shape, the input load may be efficiently absorbed.

Further, in buckling the front side member 1 in a generally Z-shape, with a view to ensuring an increase in longitudinal proof strength, the front high-strength portion 18 and the rear high-strength portion 19 are formed in the front cross-section 1F and the rear cross-section 1R respectively. In this case, the front high-strength portion 18 and this rear high-strength portion 19 are both formed through a curing process. Thus, an increase in the weight of the front side member 1 may be avoided.

Figure 7A:
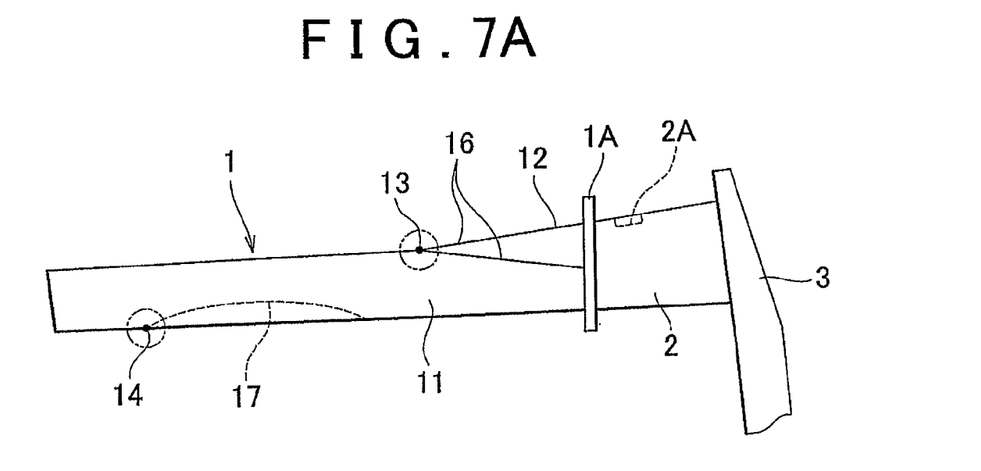
FIG. 7A is a plan view of the front side member before a collision of the vehicle.
Figure 7B:
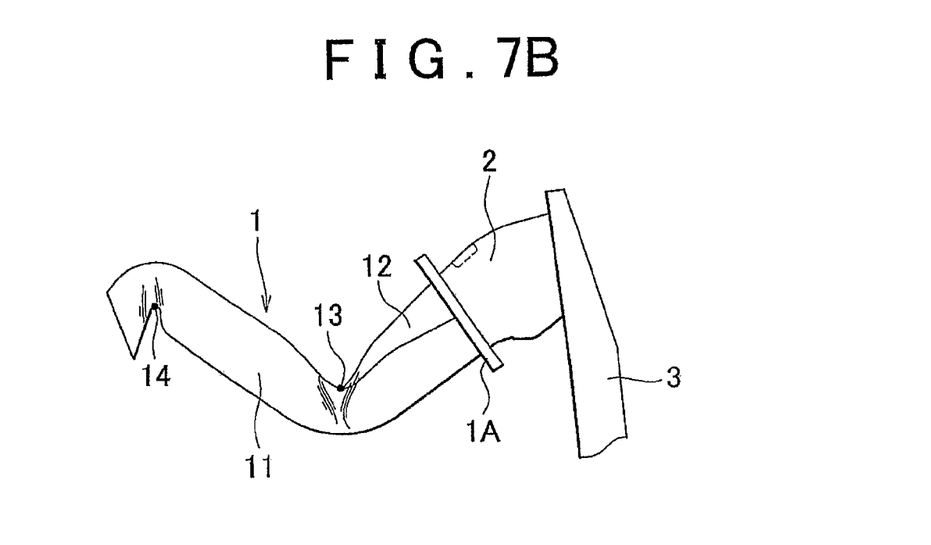
FIG. 7B is a plan view showing an example of the front side member after a collision of the vehicle has occurred.

In a plan view of the front side member 1, the front side member 1 is buckled as shown in FIG. 7B from the state shown in FIG. 7A, due to, for example, a head-on collision of the vehicle. At this moment, the front side member 1 is inflected inward in the front cross-section 1F, and outward in the rear cross-section 1R.

The power train unit 8 and the like are provided on the inner lateral side of the front side member 1 in the rear cross-section 1R. Therefore, the inner lateral side of the front side member 1 in the front cross-section 1F is wider than the inner lateral side of the front side member 1 in the rear cross-section 1R. Thus, during inflection, the front side member 1 is inflected inward in the front cross-section 1F and outward in the rear cross-section 1R. The front side member 1 is thereby restrained from interfering with the power train unit 8 and the like. Accordingly, the impact load of a collision may be appropriately damped.

Figure 8A:
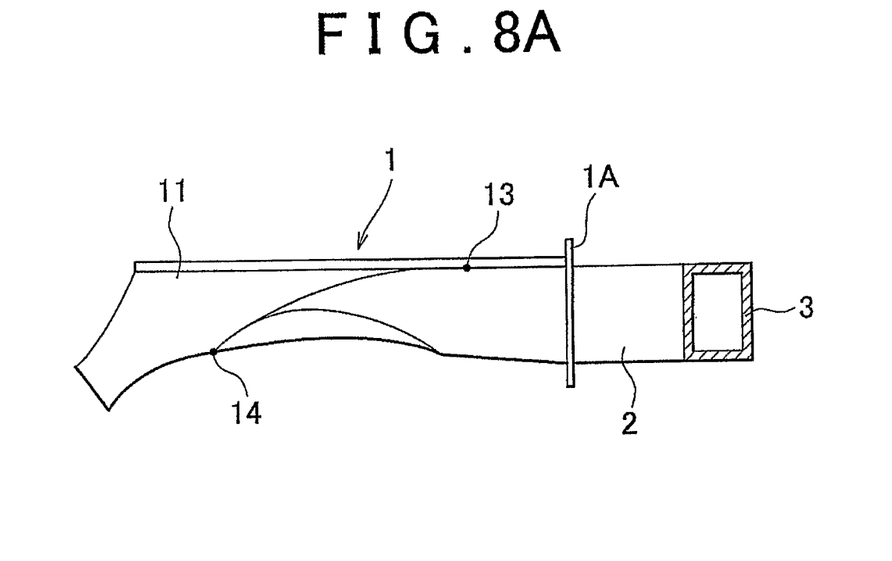
FIG. 8A is a lateral view of the front side member before a collision of the vehicle.
Figure 8B:
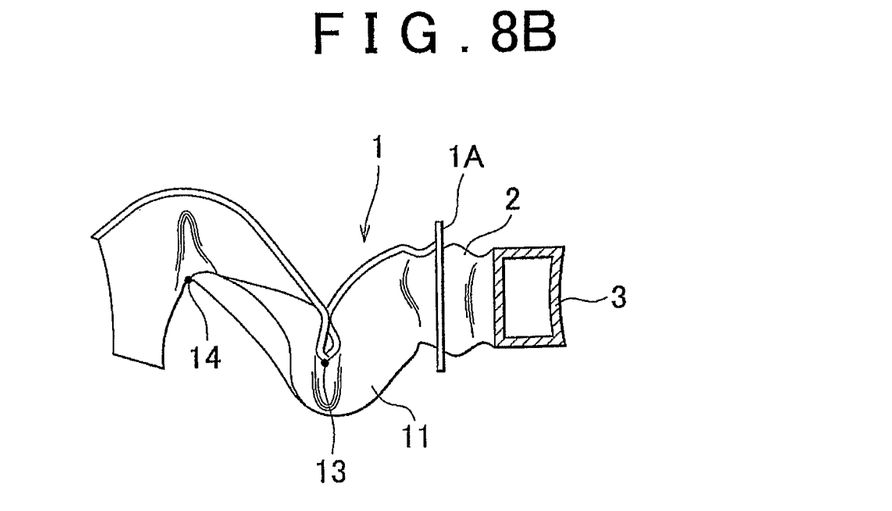

Further, in a lateral view of the front side member 1, the front side member 1 is buckled as shown in FIG. 8B from the state shown in FIG. 5A when a head-on collision of the vehicle occurs. When this occurs, the front side member 1 is inflected downward in the front cross-section 1F, and upward in the rear cross-section 1R. Thus, the interference between the power unit 8 that is provided at a side of the rear cross-section 1R and the buckled front side member 1 after the buckling of the front side member 1 may be appropriately prevented. As a result, the load received during a collision of the vehicle may be appropriately damped.

Furthermore, in the vehicle front structure according to this embodiment of the invention, the front side of the outer member 12 of the front side member 1 is flared in width direction of the vehicle. Thus, impact loads received by the front buckling point 13 arranged outside in the front cross-section 1F may be greater than the loads input to the other corner portions in the front cross-section 1F. Accordingly, the front side member 1 may be reliably inflected at the front buckling point 13 earlier than at the other corner portions in the front cross-section 1F.

Further, the portion of the crash box 2 that is joined to the front side member 1 is substantially identical in shape to a tip of the front side member 1. Thus, a greater load may be input to the front buckling point 13 than the loads input to the other corner portions in the front cross-section 1F. Accordingly, the front side member 1 can be reliably inflected at the front buckling point 13 earlier than at the other corner portions in the front cross-section 1F.

In addition, the plurality of reinforcement beads 2A are formed on the rear outer surface of the crash box 2. Thus, the load received by the outside of the front side member 1 from the crash box 2 may be increased relative to the load received by the inside of the front side member 1 from the crash box 2. Thus, a greater load may be input to the front buckling point 13 than the loads input to the other corner portions in the from cross-section 1F. Accordingly, the front side member 1 may be, reliably inflected at the front buckling point 13 before the other corner portions in the front cross-section 1F become deformed.

Although an embodiment of the invention has been described above, the invention is not limited to the described embodiment. For example, although the embodiment of the invention has been described as having a front high-strength portion 18 and a rear high-strength portion 19 that are formed through a curing process, the strength of the front high-strength portion 18 and the rear high-strength portion 19 may be increased through quenching or the provision of reinforcing members or the like.

Further, in the embodiment of the invention, the plurality of the ridge lines 16 and 17 converge at the front buckling point 13 and the rear buckling point 14 respectively to reduce the longitudinal proof strengths of the front side member 1 at the front buckling point 13 and the rear buckling point 14 respectively. However, another mode may be adopted instead. For example, the longitudinal proof strengths of the front side member 1 at the front buckling point 13 and the rear buckling point 14 may be relatively reduced by increasing the strengths of the corner portions other than the front buckling point 13 and the rear buckling point 14 in the front cross-section 1F and the rear cross-section 1R respectively.

Furthermore, the front buckling point 13 is arranged on the outer and upper side of the front side member 1, and the rear buckling point 14 is arranged on the inner and lower side of the front side member 1. However, any alternative arrangement may be adopted in which the front buckling point 13 and the rear buckling point 14 are arranged at positions that are different from each other in the width direction or the vertical direction with respect to the neutral line (the axis) of the front side member 1. For example, if entire vehicle front structure includes different components and the supported object, such as the engine or the like, is provided near a front lateral portion of the front side member 1, it is also possible to adopt a mode in which the front buckling point 13 is arranged on the inner and upper side of the front side member 1, the front high-strength portion of the front side member 1 is arranged on the inner and upper side, and the rear buckling point 14 is arranged on the outer and lower side of the front side member 1.

In addition, the front buckling point 13 may be arranged on a center lower side of the front side member in the width direction thereof, and the rear buckling point 14 may be arranged on a center upper side of the front side member in the width direction thereof. Alternatively, the front buckling point 13 can also be arranged on the center upper side of the front side member in the width direction thereof, and the rear buckling point 14 can also be arranged on the center lower side of the front side member in the width direction thereof. By adopting such an arrangement, the front side member 1 buckles with the front cross-section 1F protruding upward or downward and the rear cross-section 1R protruding downward or upward, without causing the front side member to protrude inward or outward.

Furthermore, the front buckling point 13 may be arranged on the center left side of the front side member in the vertical direction thereof, and the rear buckling point 14 may also be arranged on a center right side of the front side member in the vertical direction thereof. Alternatively, the front buckling point 13 may be arranged on the center right side of the front side member in the vertical direction thereof, and the rear buckling point 14 may also be arranged on the center left side of the front side member in the vertical direction thereof. By adopting such an arrangement, the front side member 1 buckles with the front cross-section 1F protruding rightward or leftward and the rear cross-section 1R protruding leftward or rightward, without causing the front side member to protrude upward or downward.

Further, in the foregoing embodiment of the invention, the front side member 1 generally has rectangular cross-section. However, the invention is may be applied to front side members having other cross-sectional shapes.

The invention claimed is:

1. A vehicle front structure comprising:
   a long framework member that extends in a longitudinal direction of a vehicle, wherein:
   the framework member has a front inflection portion and a rear inflection portion that are separate from each other in a longitudinal direction of the framework member and that are provided at different positions in at least one of a width direction of the framework member and a vertical direction of the framework member;
   the front inflection portion and the rear inflection portion compressively deform to buckle the framework member in a convexo-concave manner when the framework member receives an impact load along the longitudinal direction of the framework member;
   ridge lines for transmitting a load along the longitudinal direction of the framework member converge at at least one of the front inflection portion and the rear inflection portion; and
   the front inflection portion and the rear inflection portion are configured to compressively deform to buckle the framework member generally into a Z-shape when the framework member receives an impact load along the longitudinal direction of the framework member.

2. The vehicle front structure according to claim 1, wherein the front inflection portion is arranged above the rear inflection portion.

3. The vehicle front structure according to claim 1, wherein the front inflection portion is arranged inboard of the rear inflection portion.

4. The vehicle front structure according to claim 1, wherein the front inflection portion and the rear inflection portion are provided at diagonally opposite cross-sectional corners of the framework member.

5. The vehicle front structure according to claim 1, wherein the front inflection portion and the rear inflection portion are both designed such that a proof strength along the longitudinal direction of the framework member is lower at the front inflection portion and the rear inflection portion than at positions other than the front inflection portion and the rear inflection portion.

6. The vehicle front structure according to claim 1, wherein:
the framework member has a mounting member, which is a support object that is supported by the framework member, mounted on a lateral portion thereof; and
the ridge lines for transmitting the load received by the mount member converge at at least one of the front inflection portion and the rear inflection portion.

7. The vehicle front structure according to claim 1, wherein
the front inflection portion is provided on an outboard side of an upper side of the framework member; and
the rear inflection portion is provided on an inboard side of a lower side of the framework member, and positioned rearward of the front inflection portion.

8. The vehicle front structure according to claim 7, further comprising:
a crash box provided at a front end of the framework member; and
a plurality of reinforcement beads provided on a rear side of an outboard surface of the crash box.

9. The vehicle front structure according to claim 7, wherein:
the framework member includes front high-strength portions that have a higher proof strength along the longitudinal direction of the framework member than the front inflection portion, are formed diagonally across from the front inflection portion in a cross-section of the framework member; and
the framework member includes rear high-strength portions that have a higher proof strength along the longitudinal direction of the framework member than the rear inflection portion, are formed diagonally across from the rear inflection portion in a cross-section of the framework member.

* * * * *